J. B. WEAVER.
HARROW.
APPLICATION FILED APR. 17, 1915.
1,197,415. Patented Sept. 5, 1916.
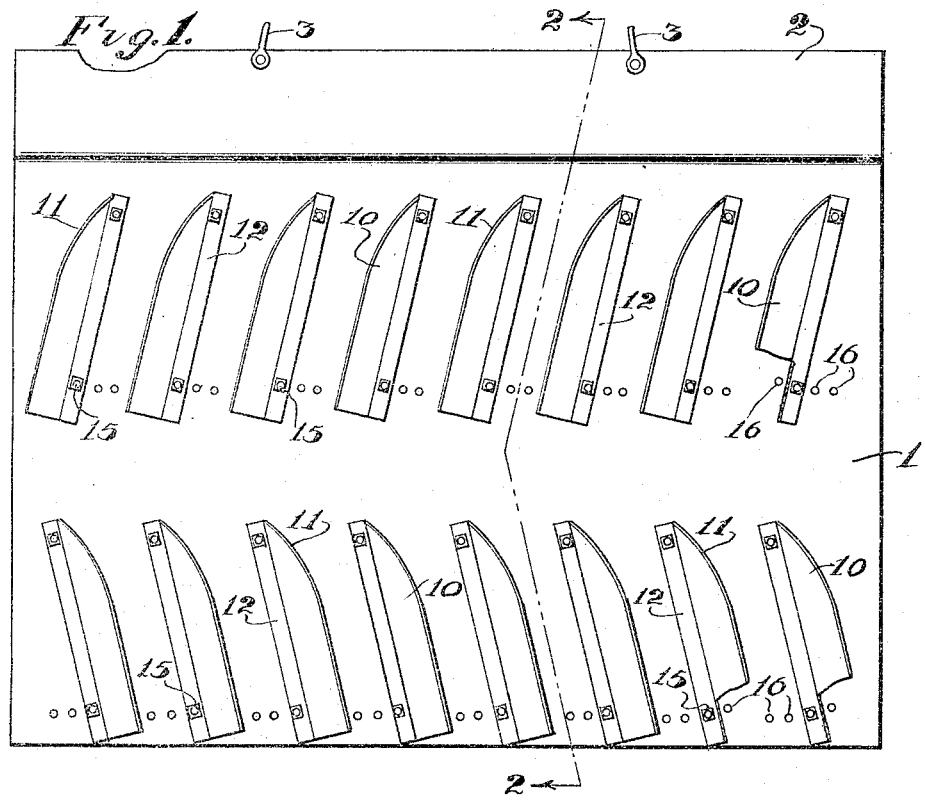
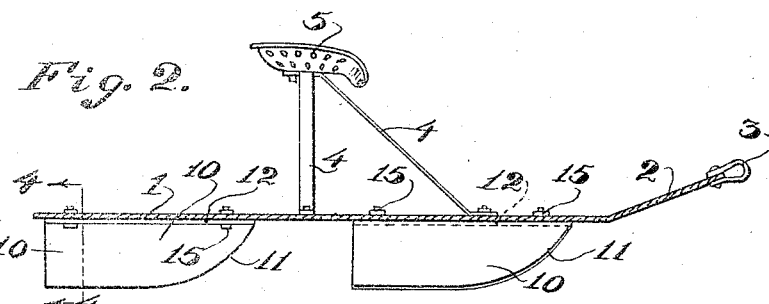
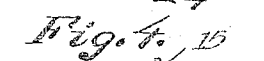
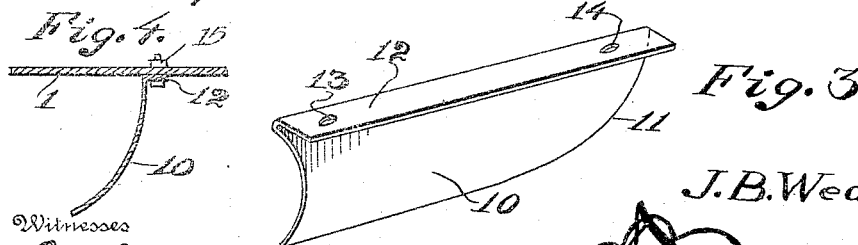
Inventor
J. B. Weaver

UNITED STATES PATENT OFFICE.

JOSEPH B. WEAVER, OF NEW OXFORD, PENNSYLVANIA.

HARROW.

1,197,415.  Specification of Letters Patent.  Patented Sept. 5, 1916.

Application filed April 17, 1915. Serial No. 22,123.

*To all whom it may concern:*

Be it known that I, JOSEPH B. WEAVER, a citizen of the United States, residing at New Oxford, in the county of Adams and State of Pennsylvania, have invented certain new and useful Improvements in Harrows; and I do hereby declare the following to be a full, clear, and exact description of the invention, such as will enable others skilled in the art to which it appertains to make and use the same.

This invention relates to harrows, and the primary object of the invention is to provide a harrow which will properly prepare a seed bed with a minimum amount of labor and time, and further a harrow which will properly crush or pulverize clods, and level the surface of the seed bed or field.

Another object of this invention is to provide a harrow as specified, which has a solid supporting plate or body, to the under surface of which are secured in gangs, positioned forwardly of each other, a plurality of arcuate angularly disposed cutting or harrow blades, and further to position the cutting blades in each gang at angles to each other, so that the soil or dirt will be turned and returned during the operation of the harrow.

Another object of this invention is to provide means whereby the angle of the harrow of cutting blades may be regulated, for regulating the depth of their insertion into the ground.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a bottom plan view of the improved harrow, Fig. 2 is a cross section on the line 2—2 of Fig. 1, Fig. 3 is a detail perspective view of one of the harrow or cutting blades, and Fig. 4 is a sectional view on the line 4—4 of Fig. 2.

Referring more particularly to the drawings, 1 designates the body plate of the harrow, which is constructed of a solid piece of sheet metal, and has its forward edge 2 bent upwardly, as is clearly shown in Fig. 2 of the drawings, for preventing dirt, clods or the like from passing upon the upper surface of the plate or body. Any suitable type of means 3 may be attached to the forward edge of the body plate 1 for facilitating the hitching of draft animals to the harrow.

The body plate 1 has standards 4 secured thereto, the upper ends of which meet, and form a support for a seat 5, of the ordinary type used in agricultural implements.

The body plate 1 has a plurality of harrow or cutting blades 10 secured to the under surface thereof in rows or gangs. The blades 10 which are positioned in the forward row or gang, angle in one direction with respect to the direction of travel of the harrow, and the blades which are in the rear row or gang, angle oppositely to the blades in the front row.

The blades 10 are constructed of any suitable type of material, such as chilled steel, and they are arcuate, curving similarly to the curvature of the mold board of a breaking plow, for throwing the dirt upwardly and turning it over during their passage through the same. The forward ends of the arcuate blades 10 curve upwardly, as is clearly shown at 11, for providing a curved surface for initiatively engaging the dirt, for insuring the free cutting travel of the blades through the soil being prepared.

The blades 10 have angularly disposed transversely extending flanges 12 formed upon their upper edges, which flanges are provided for abutting engagement with the under surface of the body plate 1. The flanges 12 are provided with openings 13 and 14 formed in the rear and forward ends thereof, through which bolts 15 are inserted for securely attaching the blades to the body plate 1.

The body plate 1 is provided with a plurality of spaced openings 16 formed therein, and positioned about an arc of a circle, by means of which the adjustment of the angle of the blades 10 may be regulated, for regulating the depth of insertion of the blades into the ground.

The forward ends of the blades 10, which are positioned in the rear row or gang, are positioned directly in the rear of the rear edges of the blades which are positioned in the forward row or gang, so that the dirt being turned by the forward gang of blades will be again engaged and returned by the rear gang. The gangs of blades are spaced from each other, so as to prevent the clogging of the blades and permit rocks, sticks or foreign material to pass rearwardly from the rear ends of the forward blades, prior to being engaged by the rear blades.

In reducing the invention to practice, certain minor features of construction, combination, and arrangement of parts may necessitate alterations to which the patentee is entitled, provided such alterations are comprehended within the scope of what is claimed.

What is claimed is:—

In a harrow structure, the combination, of a body plate constructed of a solid piece of sheet metal, the forward end of said plate being bent upwardly, a plurality of arcuate harrow blades detachably connected to the under surface of said body plate in gangs and disposed obliquely to the line of travel of the body plate, said body plate being provided with a plurality of openings adapted to receive fastening means employed for attaching the rear ends of said blades to said body plate for permitting of the adjustment of the angles of the blades with respect to the direction of travel of the body plate.

In testimony whereof I affix my signature in presence of two witnesses.

JOSEPH B. WEAVER.

Witnesses:
R. M. STRALEY,
BERNICE Z. CHRONISTER.

Copies of this patent may be obtained for five cents each, by addressing the "Commissioner of Patents, Washington, D. C."